United States Patent [19]

Grundmann et al.

[11] Patent Number: 5,321,823
[45] Date of Patent: Jun. 14, 1994

[54] DIGITAL PROCESSOR WITH BIT MASK FOR COUNTING REGISTERS FOR FAST REGISTER SAVES

[75] Inventors: William J. Grundmann, Westborough; George M. Uhler, Marlborough; Richard E. Calcagni, Hudson, all of Mass.

[73] Assignee: Digital Equipment Corporation, Maynard, Mass.

[21] Appl. No.: 542,636

[22] Filed: Jun. 21, 1990

Related U.S. Application Data

[63] Continuation of Ser. No. 221,925, Jul. 20, 1988, abandoned.

[51] Int. Cl.$^5$ .............................................. G06F 12/00
[52] U.S. Cl. .................................. 395/425; 364/259.7; 364/260; 364/262.8; 364/942.7; 364/DIG. 1
[58] Field of Search ... 364/200 MS File, 900 MS File; 395/425, 375

[56] References Cited

U.S. PATENT DOCUMENTS

| | | | |
|---|---|---|---|
| 4,041,462 | 8/1977 | Davis | 364/200 |
| 4,128,878 | 12/1978 | Yasuhara et al. | 364/200 |
| 4,205,372 | 5/1980 | Gruner | 364/200 |
| 4,236,206 | 11/1980 | Strecker et al. | 364/200 |
| 4,297,743 | 10/1981 | Appell et al. | 364/200 |
| 4,334,269 | 6/1982 | Shibasaki et al. | 364/200 |
| 4,338,663 | 7/1982 | Strecker | 395/375 |
| 4,352,157 | 9/1982 | Namimoto | 364/200 |
| 4,384,324 | 5/1983 | Kim et al. | 364/200 |
| 4,435,753 | 3/1984 | Rizzi | 364/200 |
| 4,488,227 | 12/1984 | Miu et al. | 364/200 |
| 4,533,995 | 8/1985 | Christian | 364/200 |
| 4,546,431 | 10/1985 | Horvath | 364/200 |
| 4,586,130 | 4/1986 | Butts, Jr. et al. | 364/200 |
| 4,604,695 | 8/1986 | Widen | 395/400 |
| 4,777,588 | 10/1988 | Case | 364/200 |
| 4,777,594 | 10/1988 | Jones | 364/200 |
| 4,809,162 | 2/1989 | Si | 364/200 |
| 5,057,837 | 10/1991 | Colwell | 341/55 |
| 5,179,680 | 1/1993 | Colwell | 395/425 |

OTHER PUBLICATIONS

Mishra, "The VAX Microarchitecture", Digital Technical Journal, Feb. 1987, pp. 20–33.

Troiani et al, "The VAX 8600 I Box, A Pipelined Implementation of the VAX Architecture", Digital Technical Journal, Aug. 1985, pp. 24–42.

*Primary Examiner*—Eric Coleman
*Attorney, Agent, or Firm*—Arnold, White & Durkee

[57] ABSTRACT

A high-performance, pipelined CPU in which an improved method is used for saving registers in memory upon the occurrence of a procedure CALL or RETURN. The registers which need to be saved are defined by a bit-mask, and the number of bits is counted by a hardwired circuit, in each machine cycle, producing an output in the form of an offset from a stack pointer which represents the highest memory location needed to save the registers being used. Then a memory probe can be done to see if this location is writable. Thus, in one microinstruction cycle, the count is made and the memory probe can begin.

12 Claims, 10 Drawing Sheets

DIGITAL PROCESSOR WITH BIT MASK FOR COUNTING REGISTERS FOR FAST REGISTER SAVES

This is a continuation of Ser. No. 221925, filed Jul. 20, 1988, now abandoned.

BACKGROUND OF INVENTION

This invention relates to a central processing unit (CPU) of a computer system, more particularly, to a method for saving or retrieving a set of CPU registers in procedure CALL or RETURN instructions.

In high performance computer systems, memory is allocated to each process or job by the operating system software. As each process is executed the CPU must assure, for system and process security reasons, that only the memory space allocated for that process is used. This assurance requires constant CPU checking of every memory address against the process memory boundaries, causing a slower process or job run time. To insure that the execution of some CPU instructions will complete successfully, it is often necessary to predict what memory space will be required before the operation is even started.

One such operation requiring this prediction is the pushing (writing) of register contents on a stack before a procedure is invoked. None of the registers can be written to the stack without first knowing that all can be written successfully. This requires determining the number of registers to be written, computing the boundary addresses, and comparing the addresses against the process memory allocation.

An example of this operation is a CALL macroinstruction, where one of the operations required in the execution of this instruction is to save (push/write to a memory stack) the contents of one or more of the general purpose registers as specified by the user in a save-mask found in memory. In one example, the VAX architecture requires that the memory required for the stack write be validated for the process before the writing is performed. According to the present invention, a method is described for quickly counting the bits in the save-mask, resulting in a count representing the number of registers that are to be saved. A subsequent microcode flow then uses the count value along with a base memory address to probe the boundaries of stack required, making sure that the needed memory is available in the stack. Thus, a method is provided which significantly reduces the execution steps and time required to pre-compute the memory boundary addresses for writing a variable number of registers to sequential memory locations.

In prior CPU implementations the problem was solved differently. Some used a method which first assumed the maximum number of bits to be set in the save-mask, and tried or probed memory with that assumption; then if a memory bounds failure occurred, the CPU reverted to counting the save-mask bits. Other prior CPU's started the operation by counting the save-mask bits. All of these previous CPU implementations utilized microcode procedures to count the number of bits in the save-mask. These procedures performed the operation by examining each of the save-mask bits, and accumulating a count representing the number of bits that were set. Since this procedure was always implemented with microcoded program loops, the operation took a significant number of cycles to complete, and caused a loss in performance. In contrast, the method of the present invention performs the same task using combinatorial logic, and produces the same result in one machine cycle.

SUMMARY OF THE INVENTION

According to one embodiment of the invention, a high-performance, pipelined CPU uses an improved method for saving registers in memory upon occurrence of a procedure CALL or RETURN. The registers which need to be saved are defined by a bit-mask, and the number of bits is counted by a hardwired circuit, in each machine cycle, producing an output in the form of an offset from a stack pointer which represents the highest memory location needed to save the registers being used. Then a memory probe can be done to see if this location is writable. Thus, in one microinstruction cycle, the count is made and the memory probe can begin.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings wherein:

FIG. 8 is an electrical diagram in block form of the bus interface unit of the CPU of FIG. 1;

DETAILED DESCRIPTION OF A PREFERRED EMBODIMENT

The CPU

Figure 1:
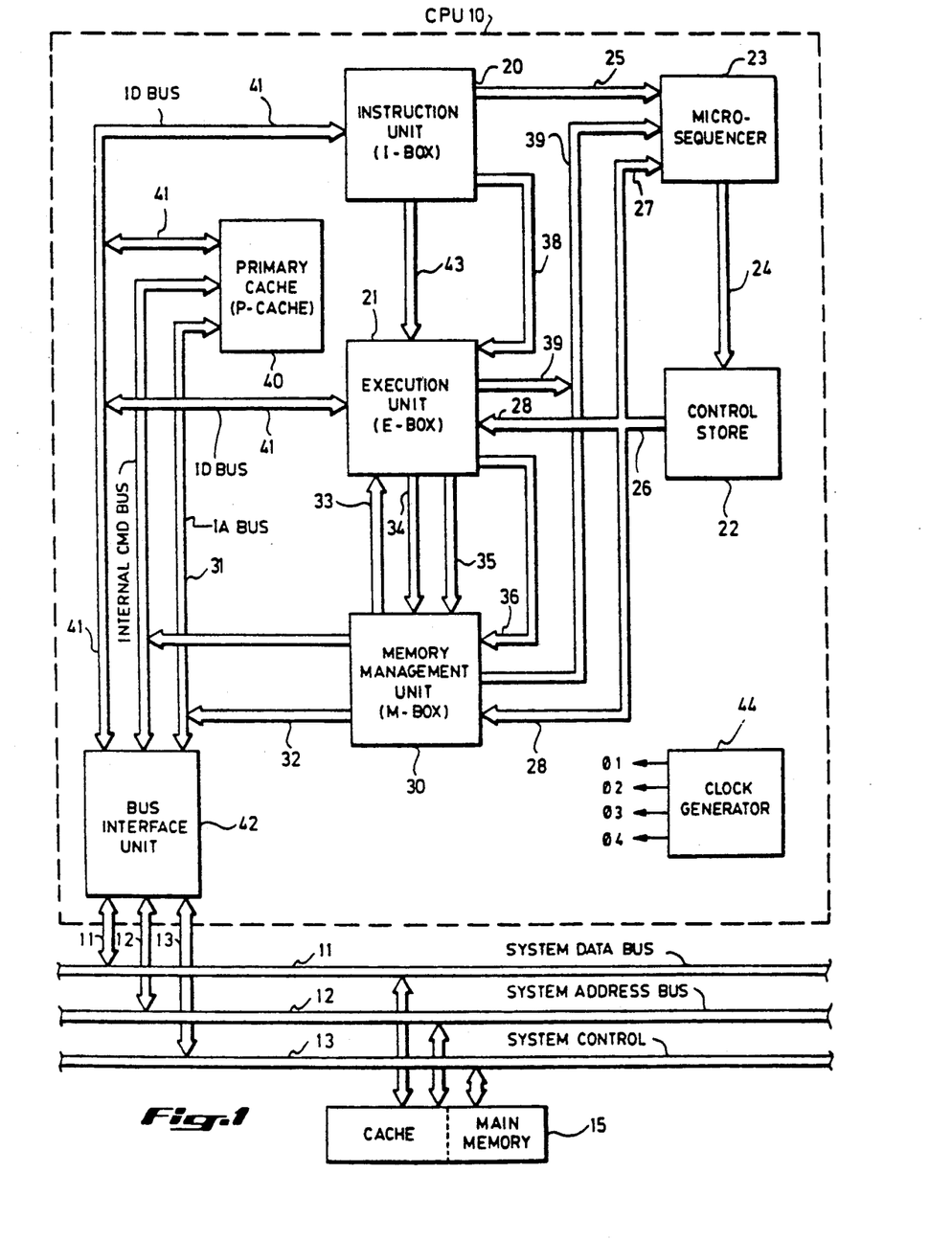
FIG. 1 is an electrical diagram in block form of a computer system including a central processing unit according to one embodiment of the invention.

Referring to FIG. 1, a CPU or central processing unit 10 which may use the features of the invention is illustrated. In a preferred embodiment, the CPU 10 is constructed as a single integrated circuit, but the CPU may be an integrated circuit chip set, or may be implemented with standard logic circuits or gate arrays mounted on one or more circuit boards. Although this invention is useful in any pipelined CPU, the example given here is one which executes a VAX instruction set and generally conforms to the architecture of VAX computers previously sold by the assignee. In the illustrative embodiment, the CPU 10 is connected to a system data bus 11, for example a 64-bit bidirectional bus, and to a 27-bit system address bus 12 and a system control bus 13. These busses 11, 12 and 13 are connected to system memory 15 which is not shown in detail but would usually include cache and cache controllers. The busses also access various I/O equipment.

The CPU 10, in its internal construction, includes an instruction unit 20 (referred to as the "I-Box") which functions to decode machine-level instructions for execution, along with an execution unit 21 (referred to as the "E-Box") which performs the data-manipulation part of the execution of the instruction. The CPU 10 is of the microcoded type, and employs a control store 22 which consists of a ROM (or EPROM, or the like) containing perhaps 1K or 2K words of microinstructions, with each word being fifty bits wide in this example. The control store is addressed by a microsequencer 23 which generates a series of microaddresses on an 11-bit address input 24 of the control store 22, based upon an entry point address or dispatch address received from the instruction unit 20 by an 11-bit dispatch bus 25. The output from the control store 22 is a microinstruction bus 26, 50-bits wide in this embodiment; sixteen bits of the bus 26 are connected back to an input 27 of the microsequencer 23 to provide addresses of microinstructions in a sequence following an entry point, and to provide control of the microstore addressing. The remaining thirty-four bits of the microinstruction output 26 are used as control inputs 28 to the execution unit 21 and other parts of the CPU.

The CPU 10 uses virtual addressing, and a memory management unit 30 (also referred to as the M-Box) is employed to translate a virtual address to a physical address. This unit also arbitrates instruction fetches for the instruction unit 20. The memory management unit is controlled by the 34-bit input 28 from the microinstruction bus, as well as other signals. The unit 30 is connected to a 30-bit internal address bus 31 via output 32, and is connected to the execution unit 21 by a 32-bit ALU AABus 33 for reading address registers from the memory management unit. Other connections between the memory management unit 30 and the execution unit include a 32-bit ALU output bus 34 and a 32-bit- write-data bus 35; functions of these busses 33, 34 and 35 will be explained in reference to the internal construction of the execution unit 21. The unit 30 receives control bits via lines 36 from the execution unit for the purpose of defining the memory operation and word length; these control bits on lines 36 originate in the instruction unit 20 and are coupled to the execution unit 21 as part of a control bus 38. The memory management unit 30 as well as the execution unit 21 generate controls defined as microtest which are connected to an input of the microsequencer 23 via 3-bit bus 39; this is conditional data for microinstruction branching as determined by events within the execution unit 21 or memory management unit 30.

The CPU 10 includes a primary cache 40 (also called "P-Cache") which is in the example a 2K-byte high-speed RAM containing the most recently used memory data, this being either instructions or data. The cache 40 is connected to the 30-bit internal address bus 31, and to a 32-bit internal data bus 41. The internal data bus 41 also conveys instructions fetched by the memory management unit 30 for use by the instruction unit 20, and operands transferred to or from the execution unit 21.

A bus interface unit 42 controls or arbitrates the connections between the various internal busses of the CPU 10 and the system busses 11, 12 and 13, based upon an internal command bus, as well as clocks and other control bits.

Immediate (or literal) operands or addresses, contained in the instruction stream, are loaded into the instruction unit 20 by bus 41. These operands are transferred to the execution unit 21 for loading to registers by a 32-bit bus 43.

A clock generator 44 produces a four-phase output (phi-1 to phi-4) which establishes a machine cycle of four phases P1, P2, P3 and P4 as will be referred to. For an example, the clock rate is 25-MHz, producing a machine cycle of 40ns.

The Execution Unit

Figure 2:
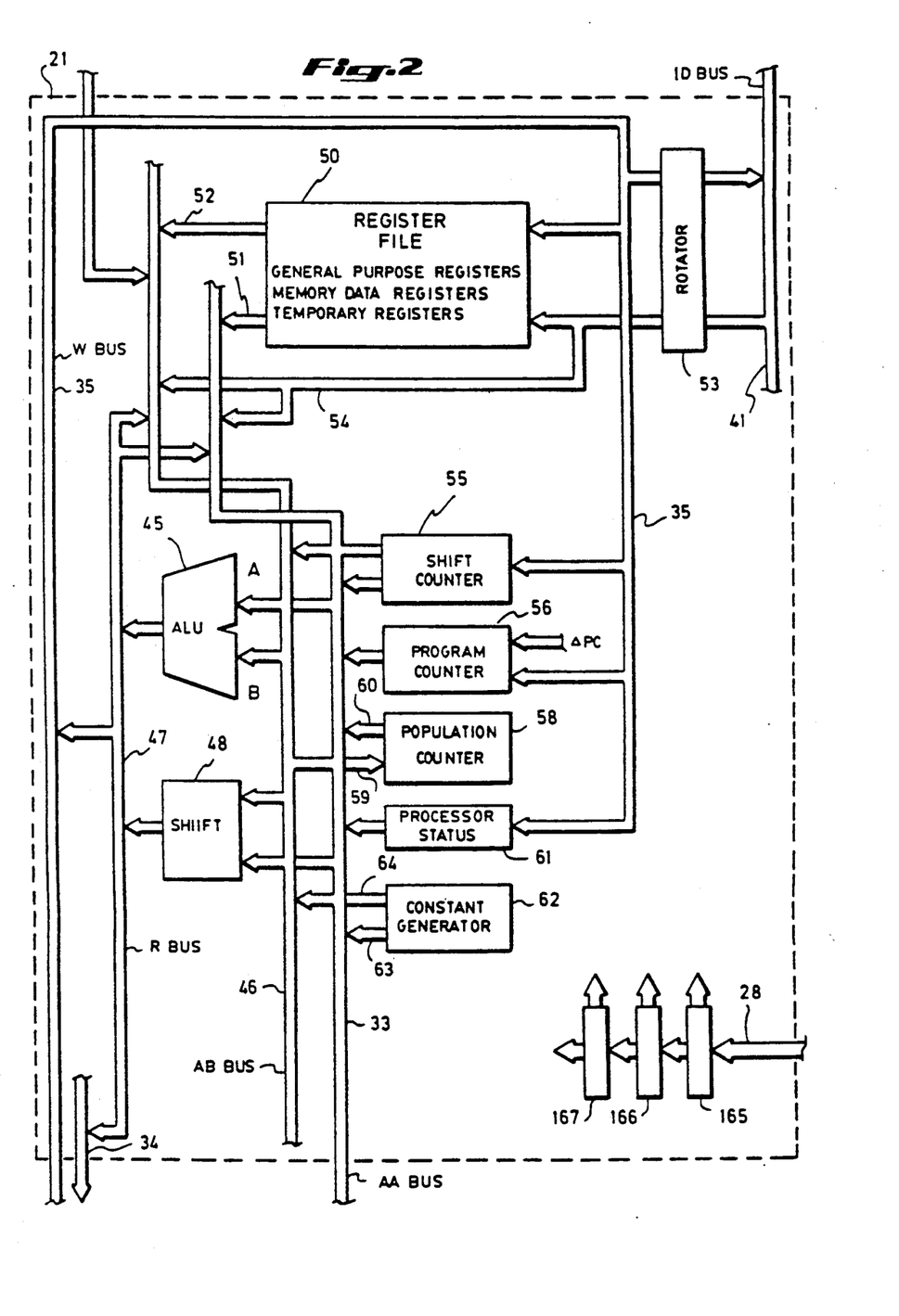
FIG. 2 is an electrical diagram in block form of the execution unit of the CPU of FIG. 1.

Referring now to FIG. 2, the execution unit 21 is shown in more detail. This unit includes a 32-bit ALU 45 which has a 32-bit wide A-input from the AABus 33 and a 32-bit wide B-input from an ABBus 46. The ALU 45 performs the Add, Subtract, OR, etc., operations as needed to support the instruction set of the CPU, as defined by a field of the currently-used microinstruction from the bus 28. The output of the ALU is always to a result bus 47, and thus to the write bus 35. The only two sources of data to the result bus are the ALU and a barrel shifter 48, which is a 64-bit in, 32-bit out, shifter unit that implements shift operations of the instruction set. Zero to 32-bit right shifts and zero to 32-bit left shifts can be performed, under control of fields in the microinstructions sent via the bus 28. The data on the result bus 47 can be loaded to the AABus 33 or the ABBus 46 for bypass, or to the write bus 35, as well as to the ALU output bus 34 going to the memory management unit 30.

The write bus 35 can write to a register file 50, which is a set of forty-one 32-bit registers, including fifteen general purpose registers, eighteen temporary registers, and eight memory data registers; these registers contain operands and addresses currently being used, and writing to and reading from the register file is under control of fields of the current microinstruction, the only output of the register file being by 32-bit outputs 51 and 52 to the AABus 33 or ABBus 46. The internal data bus 41 can also write via rotator 53 to certain registers of the register file as determined by the microinstruction, and the internal data bus can also bypass the register file and write directly to the AABus and ABBus via input 54, as when data from the internal data bus is being written to a register file and is also being used as an ALU input in the same cycle.

A shift count register 55 provides a shift count for the shifter 48, and also functions to count cycles (as useful in multiply or divide). This counter 55 is a 32-bit register which may be loaded from the write data bus 35 or loaded to the AABus or ABBus under microinstruction control.

A 32-bit program counter or PC 56, containing an internal adder, is also part of the register set. The PC 56 contains the address of the instruction being executed. As an instruction (including opcode and operand specifier bytes, and specifier extensions) is parsed in the instruction unit 20, the PC 56 is updated to track the address by the delta-PC bits from the instruction unit on bus 38. The program counter may also be loaded from the write bus 35. The output 57 of the program counter 56 is to the AABus, from which the address passes through the ALU 45, and, ordinarily, to the memory management unit 30 via bus 34.

A counter circuit 58, referred to as the population counter, receives its input 59 from the ABBus 46 and produces an output 60 to the AABus 33; this circuit functions to count the number of bits set in a binary word loaded to the ABBus and to produce a binary value equal to this count of bits. The population counter 58 is used to count the number of bits in a save mask (a binary word, each set bit of which corresponds to a register that needs to be saved) where the binary value is used to determine the number of registers from the register file 50 or register set that must be saved in a procedure CALL, RETURN, Push-Register, or Pop-Register.

A processor status register 61 is also included in the set of registers of the execution unit 30. This status register contains the ALU condition bits, such as carry, overflow, zero and negative, as well as various other status bits such as interrupt priority level, trace pending, etc. The status register can be read onto the AABus 33, or written via the write bus 35, under microinstruction control.

A constant generator 62 produces constants for loading to the AABus or ABBus via outputs 63 and 64. The microinstruction can contain an 8-bit constant in a field of the bus 28 (a "microinstruction literal"), and this byte can be loaded to the ABBus by the constant generator 62 at any of the four byte positions of the 32-bit word width as determined by another 2-bit field of the current microinstruction. Also the generator can produce a constant of 1, 2, 4 or 8 in response to the value of the data-length DL control bits on lines 38, and this constant, representing the number of bytes in the operand to be handled, is loaded to the ABBus 46 via output 64. The constant generator is also used along with the shifter for sign-extending data.

The rotator 53 is the I/O interface between the execution unit 21 and the internal data bus 41, and functions to align the data on longword boundaries when loaded to the registers or bus of the execution unit, or to restore the data going from the execution unit 21 to memory to the intended byte positions. The two least significant bits of the address, and data length (DL control bits on bus 38), are used by the rotator 53 to make these transitions.

The Microsequencer

Figure 3:
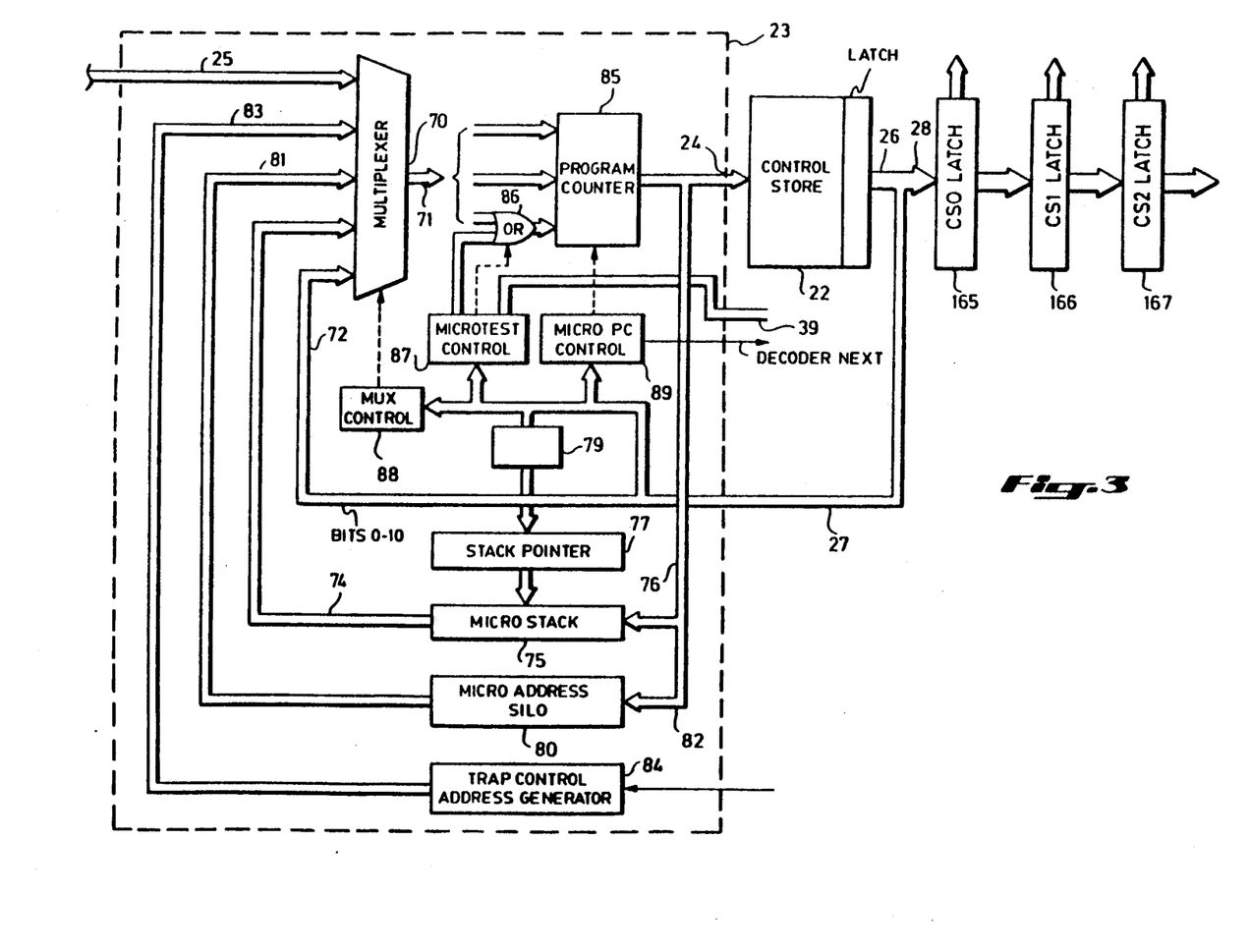
FIG. 3 is an electrical diagram in block form of the microsequencer of the CPU of FIG. 1.
Figure 4:
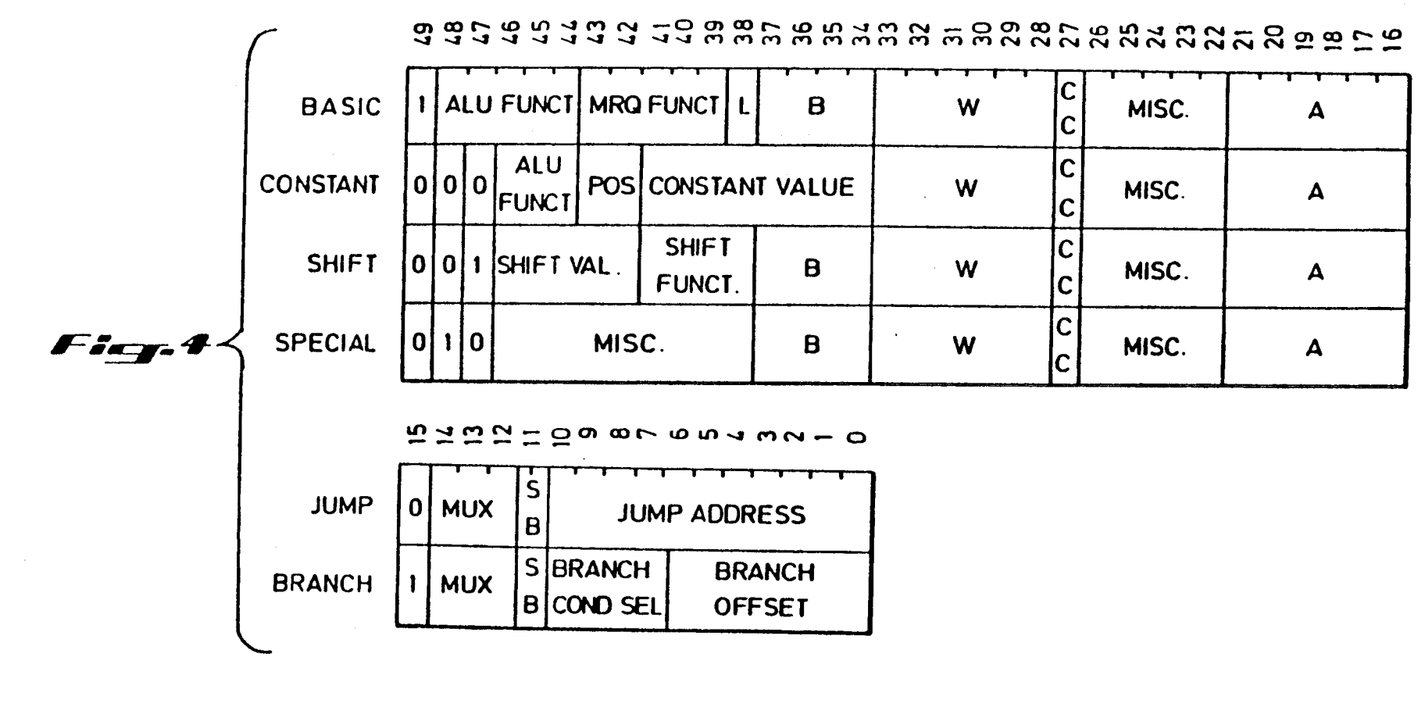
FIG. 4 is a diagram of the format of microinstructions contained in the control store of FIG. 3.

Referring now to FIG. 3, the microsequencer 23 is shown in more detail. The microsequencer produces an 11-bit address to the control store 22 in every machine cycle, and at the beginning of the next cycle the control store 22 produces a 50-bit latched output on bus 26, sixteen bits of which are fed back into the microsequencer for address and control by bus 27. These sixteen bits include an address for the next microinstruction, along with control information. FIG. 4 shows the format of the 16-bit data on the bus 27, where the two types of address and control information are seen to be a jump and a branch. The jump includes an 11-bit jump address, bits 0-10, and a 3-bit mux-control field, bits 12-14, while bit-15 is always "0" for a jump (and always "1" for a branch). Bit-11 is for microsubroutine control, for either type. The branch format includes a 7-bit offset, bits 0-6, and a 4-bit branch condition selector field.

The mux-control field is used in the microsequencer 20 of FIG. 3 to control a multiplexer 70 to produce one microaddress output 71 from a number of inputs; one input 72 to the multiplexer 70 is the jump address field, bits 0-10 from the bus 27, and of course another is the dispatch address 25 from the instruction unit 20. If the microinstruction on the output 26 is the last one of routine or microflow, a "decoder-next" output is asserted to cause the I-Box 20 to produce a new dispatch.

A third input to the multiplexer 70 is an output 74 (a stack read bus) from a register stack 75. The microaddress stack 75 is a push-down stack for storing up to eight of the 11-bit addresses appearing on the bus 24 and thus appearing on an input write bus 76 for the stack. A stack pointer 77 points to the TOS or top-of-stack, and this pointer is incremented or decremented for PUSH or POP stack operations by controls from the bits 11-15 of the control information on the bus 27, as connected via bus 78 to stack control decoder 79. If a CALL is decoded, the 11-bit address on input 76 is PUSHed to the stack 75, or if a RETURN is decoded the TOS is selected as the input to the multiplexer 70, and the stack is POPed by decrementing the pointer 77.

A microaddress silo 80 provides another input 81 to the multiplexer 70. This silo is a FIFO memory having three registers, storing the three last-used 11-bit addresses from the address bus 24, via input 82. This silo is constructed as a shift register which is clocked forward by each machine cycle, except when a stall or a trap is signalled, in which case the three addresses in the silo are saved until a trap ends, when the last three addresses may be used by jumping to a recover micro-routine, which will use the silo input 81 by the proper code to the multiplexer via bus 78.

The other input to the multiplexer 70 is an output 83 from a trap control address generator 84. A number of different types of trap microroutines, and thus addresses for starting these microroutines, are available.

A branch address, specified when bit-15 on bus 78 is a "1", is made up of three parts, assembled in the microprogram counter 85. Bits 7-10 of the 11-bit branch address are copied from the current microinstruction (i.e., the one currently already in the counter 85), and bits 0 and 4-6 are copied from the microinstruction by the input 72, while bits 1-3 are the logical OR, via gate 86, of the microinstruction on input 72 and the contents of the 3-bit microtest bus 39. That is, "Branch" type microinstructions (microbranch instructions) are detected on the microinstruction bus 28 by the microtest control logic 87. Upon detecting a microbranch instruction, the control logic 87 forwards conditions present on the microtest bus 39 to the OR gate 86, and, at the same time, MUX control logic 88 also detects a microbranch instruction on the microinstruction bus 27, and causes the microprogram counter 85 to compute a branch destination address based on the OR-ing of the conditions on the microbranch bus 173 and selected bits from the microbranch instruction provided as input to the multiplexer 70.

Also seen in FIG. 4 is the format of the microinstruction word, particularly the 34-bit part appearing on the bus 28 at the output of the control store. Four general types of microinstructions are used, these being referred to as Basic, Constant, Shift and Special. For each of these, bits 16-33 are the same and include a 6-bit "A" field (bits 16-21) which selects the source of the AABus 33 in the execution unit, and a 6-bit "W" field (bits 28-33) to select the destination, i.e., where the write bus 35 is written, such as one of the registers in the register file 50. Bit-27 is a condition code control for the processor status register 61. The miscellaneous field, bits 22-26 is decoded to define the particular operation to be performed. The Basic, Shift and Special types all have a "B" field (bits 34-37) which selects the source of data on the ABBus 46, i.e., the ALU B input. The Shift type has fields (bits 38-46) which define the shift function to be performed in the shifter 48 and the shift value (number of bits from zero to 32bits). The Constant type of microinstruction format includes a constant value (bits 34-41) for a microinstruction literal operation, to be loaded to AABus via constant generator 62, and a position field (bits 42-43) for defining constant position. The function to be performed by the ALU 45 (e.g., Add, Subtract, AND, Pass, etc.) is defined by bits 44-48 of the Basic format or bits 44-46 of the Constant format. The bit-38 of Basic is a data word length control, and bits 39-43 define the memory request function.

The Instruction Unit

Figure 5:
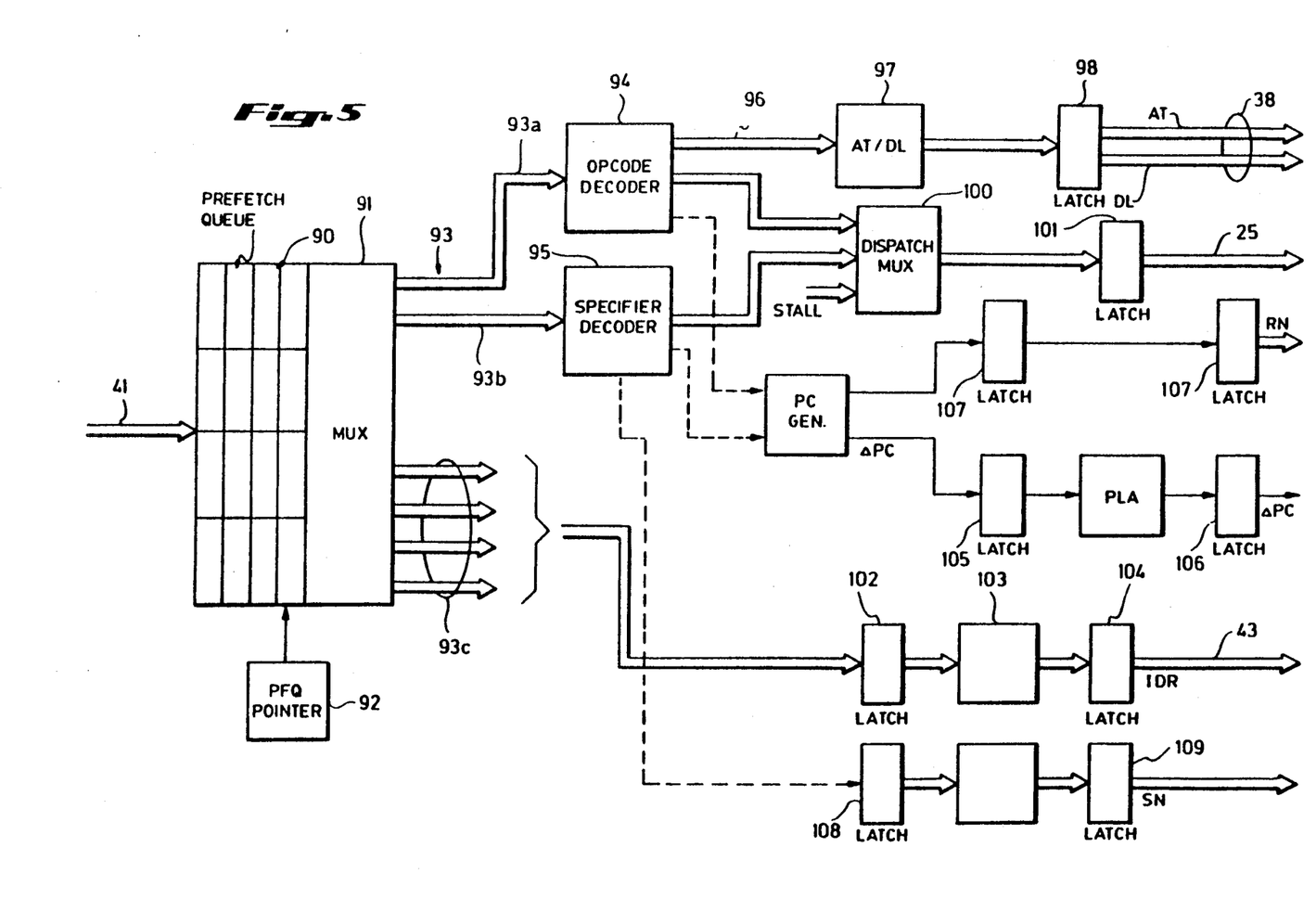
FIG. 5 is an electrical diagram in block form of the instruction unit of the CPU of FIG. 1.

In FIG. 5, the internal construction of the instruction unit 20 is illustrated. Instructions are loaded from internal data bus 41 into a prefetch queue 90, which is a FIFO constructed as a set of high-speed registers holding four 32-bit longwords (four four-byte instruction and operand words). Since the instructions are of variable length, having a variable number of operands and specifiers following an opcode of one or two bytes, and might not be aligned on word boundaries, the prefetch queue 90 functions to allow the information needed to begin parsing and decoding the next instruction or operand to be immediately accessible. The prefetch queue is capable of shifting up to two longwords in a machine cycle; instruction stream data is supplied to the input of the prefetch queue 90 whenever the queue is not full and no other system process requires the data path. A prefetch multiplexer 91 receives 4-bit address information from a prefetch pointer 92 to produce at an output 93 six bytes from the prefetch queue 90 which represent the next six valid bytes starting with an opcode; the opcode might not be on a longword boundary, so the output 93 includes an opcode byte 93a, a specifier byte 93b, and four bytes 93c of specifier extension field selected from queue 90 by the multiplexer 91 beginning at any of the byte positions of the queue. Two of these six bytes are connected to a set of decoders or PLA's including an opcode decoder 94 and a specifier decoder 95.

Based upon the opcode byte on output 93a, the decoder 94 produces on output 96 several sets of access type and data length control bits (referred to as AT/DL controls), one set for each operand to be used for this instruction. A multiplexer 97, receives this output 96 and selects one set for each operand as it is being defined. The output of multiplier 97 is held in a latch 98, from which the AT/DL part of the control bus 38 going to the execution unit 21 is obtained.

A dispatch multiplexer 100 selects whether the dispatch address 25 to be sent to the microsequencer 23 is an execution dispatch from the instruction decoder 94, a specifier dispatch from the specifier byte decoder 95, or a stall dispatch. A stall dispatch is produced whenever there are insufficient bytes in the prefetch queue 90 to define an execution or specifier dispatch. This stall dispatch merely forces a dispatch address to the microsequencer 23 to address a microinstruction which does nothing but issue a "decoder next" request back to the I-Box, thus a do-nothing cycle is introduced to allow the I-Box to fill the PFQ. The 11-bit address output from this multiplexer 100 is latched into a dispatch address latch 101, so it can be available for siloing. The specifier extension data, up to four bytes on the outputs 93c from the queue 90, is applied to a latch 102, from which it passes though a formatter 103 which sign-extends and right-justifies any specifier extension data that may exist, then to another latch 104 from which this data is connected by 32-bit bus 43 to the execution unit 21.

Also, the I-Box produces a delta-PC value in latch 105, which represents the amount the program counter 56 should be incremented in order for the E-Box PC 56 to point to the next opcode or specifier, this being based upon the number of bytes in the opcode and specifiers currently being processed. The delta-PC value in latch 105 is transformed by a PLA then loaded to a latch 106 to be available in the next machine cycle for use by the E-Box via bus 38. In addition, the I-Box produces a 4-bit RN field in latches 107, which specifies one of the sixteen general purpose registers in register file 50 that is to be used for the current specifier or execution microflow. This RN field is derived from the register field of a specifier byte. Further, a 3-bit SN field is produced in a latch 108 to specify the memory data register in the register file 50 that should be used to store the result of the current specifier flow. The value in the latch 108 is transformed in a PLA and loaded to latch 109 in the second cycle, ready for use by the E-Box in the third cycle via bus 38.

The Memory Management Unit

Figure 6:
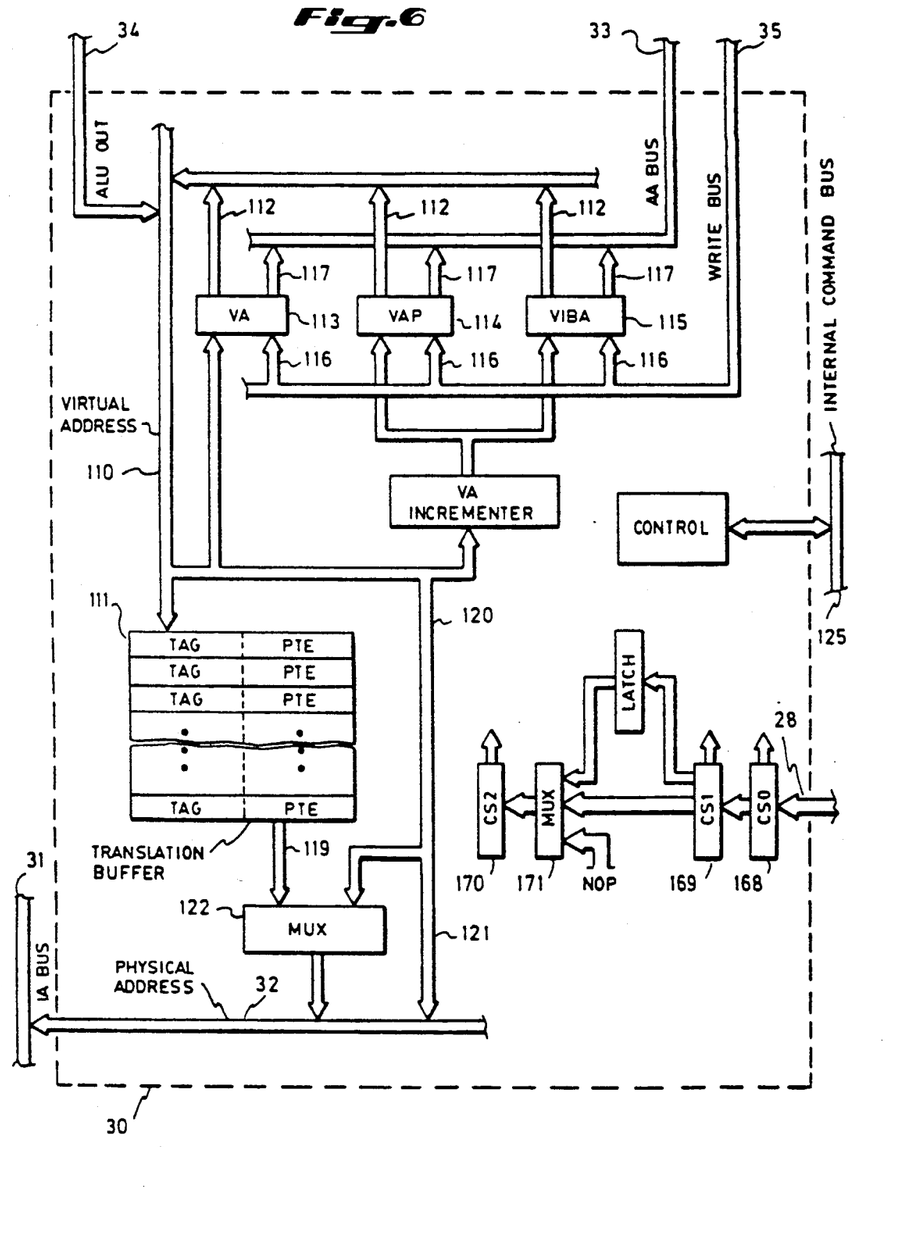
FIG. 6 is an electrical diagram of the memory management unit of the CPU of FIG. 1.

The memory management unit 30 is seen in detail in FIG. 6. Any address for instruction or data read or write appears on a 32-bit virtual address bus 110, and this virtual address is used in a translation buffer 111 to generate a physical or real address which appears on the bus 32 going to the internal address bus 31. The virtual address may be generated at the output of the ALU 45 in the execution unit 21 and applied by the ALU output bus 34 to the virtual address bus 110, or it may be loaded to the bus 110 via outputs 112 from three registers, these being a virtual address register 113, a virtual address prime (VAP) register 114, and a virtual instruction buffer address (VIBA) register 115. The three registers 113, 114 and 115 allow many addresses to be generated without using the main data paths and ALU of the execution unit 21. Each of these registers can be written from the write bus 35 via inputs 116, or read via outputs 117 and the AABus 33, under control of the W and A fields of the microinstruction. The VA register 113 provides the address for write operations, and it also latches the virtual address from the bus 110 for every memory request, so if a memory management exception occurs, a microinstruction can always access the faulting address in the VA register 113. The VAP register 114 always latches the VA bus 110 plus four, so it contains the address of the next sequential longword; this register is used by microinstructions to access multiple longwords, and also to access the second longword of unaligned memory references, i.e., a memory reference that requires a second reference to complete. The VIBA register 115 is loaded whenever a microinstruction performs a flush and load of the program counter 56; the VIBA register is then used to prefetch longwords of instruction stream data from memory for filling the prefetch queue 90, being incremented by four after every instruction stream longword fetch. An incrementor functions to increment the registers 114 and 115 by four.

The translation buffer 111 is a fully associative memory containing sixty-four locations, each location containing a tag of a recent successful translation along with the page table entry (PTE) for this tag. The page address (bits 9-31) of each virtual address received from the bus 110 by the translation buffer is compared to the 23-bit tag of all sixty-four entries, and if a match occurs the PTE corresponding to the matched tag is output on bus 119 (21-bits). The lower thirty bits of the virtual address bus 110 appear on a bus 120, from which bits 0-8 are applied directly to the internal address bus 32 via lines 121 and constitute the byte address within a page; the twenty-one bits 9-29 from the VA bus 110, via bus 120, are one input to a multiplexer 122 and the 21-bit PTE from the translation buffer are the other input via bus 119, so the upper 21-bit part of the address applied to the internal address bus 31 via bus 32 is thus either directly from the VA bus or translated via the buffer 111 and the PTE. That is, by microinstruction control, the address applied to the internal address bus 31 may be directly from the VA bus 110, or it maybe a translated address using the translation buffer 111.

If the page of the address on the VA bus 110 is not among the sixty-four tags in the buffer 111, and a translated address has been specified, then a fault condition is signalled, this being a TB fault. The microsequencer 23 produces the starting address for a routine that allows the page address to be looked up in a table maintained in memory 15 or cache by the operating system; this of course will require a number of microinstruction cycles to accomplish.

A controller within the unit 30, responsive to the microinstruction currently asserted for each segment of the unit 30 in the pipeline (as explained below), produces a command on the internal command bus 125 for defining the operation of the bus interface unit 42.

The Primary Cache

Figure 7:
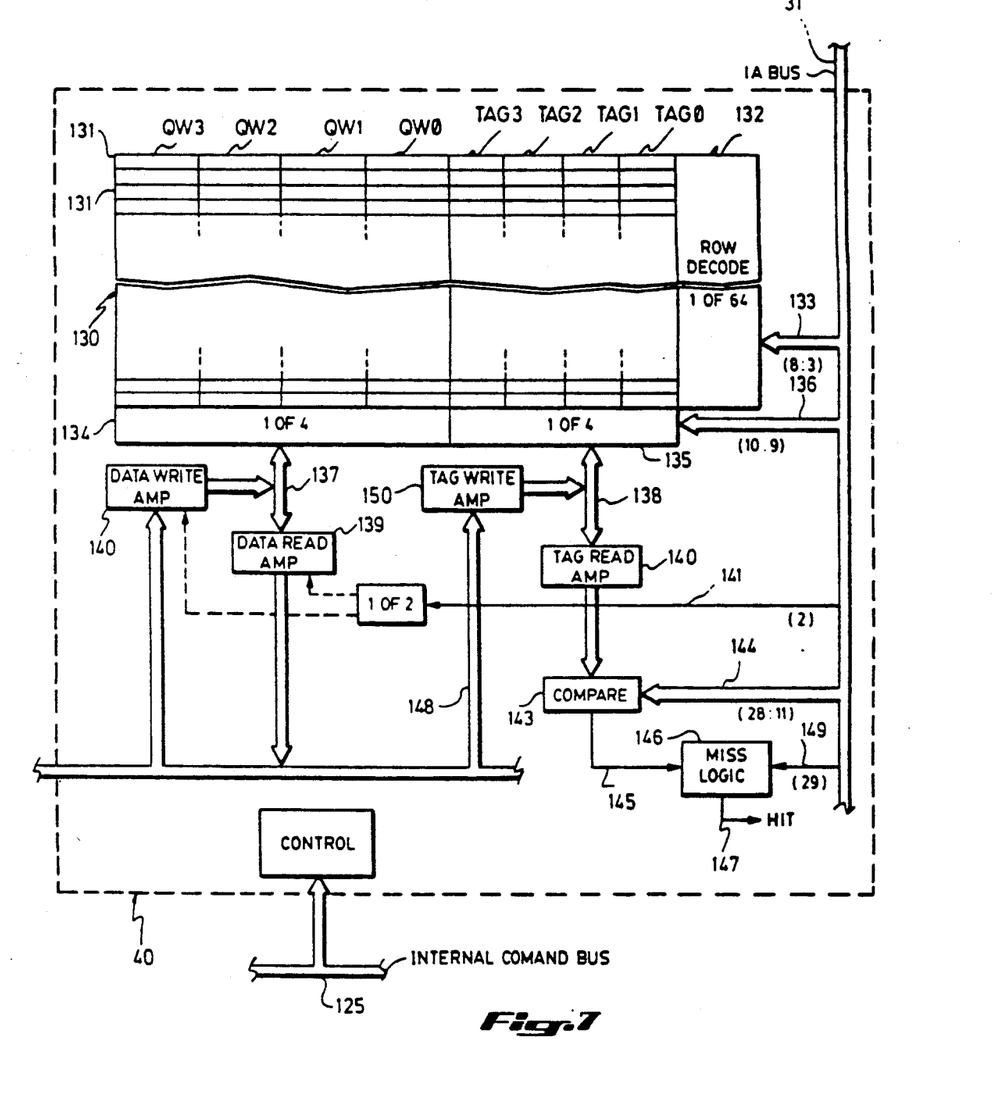
FIG. 7 is an electrical diagram in block form of the primary cache or P-cache memory of the CPU of FIG. 1.

Referring now to FIG. 7, the primary cache or P-Cache 40 is shown in more detail. This cache contains a 2K-byte- high-speed memory 130 which is addressed by the internal address bus 31 and which reads to or is written from the internal data bus 41. The memory 130 is organized as sixty-four rows with four quadwords QW0, QW1, QW2 and QW3 in each row, along with four corresponding tags Tag0, Tag1, Tag2 and Tag3, one for each quadword. A row decoder 132 selects 1-of-64 based upon six bits 3-8 on lines 133 from the internal address bus 31. The row selected will be loaded to a column decoder 134 for the data and a column decoder 135 for the tags, where a 1-of-4 selection is made based upon two bits 9-10 on lines 136 from the IA bus 31. In this manner, one tag (19-bits) and one quadword (64-bits or eight bytes) are selected at data and tag I/O busses 137 and 138 within the P-Cache. The data bus 137 is read by sense amplifiers 139, or written by write amplifiers 140, where another 1-of-2 selection is made based upon bit-2 on line 141 from the IA bus 31, so that a selected 32-bits or four bytes are loaded to or transferred from the internal data bus 41, if there is a tag hit. The tag read from the selected location in cache memory 130 is compared in a comparator 143 to the eighteen bits 11-28 from the IA bus 31 via lines 144. If all bits are the same, a hit is signalled on line 145, from which miss logic 146 produces a P-Cache hit output on line 147 if bit-29 of IA bus 31 via line 149 does not indicate that the reference is to I/O space, since I/O references are never cached. A write amplifier 150 is also provided for the tag I/O bus 138 for loading the tags when the cache 130 is filled.

The Bus Interface Unit

Referring to FIG. 8, the bus interface unit 42 drives the 27-bit system address bus 12 based upon the 30-bit physical address on the internal address bus 31; the difference is because the 30-bit address on the bus 31 is a byte address and the 27-bit address on the bus 12 is aligned for quadwords (eight bytes), corresponding to the quadword (64-bit) width of the system data bus 11. To allow this transition, and to allow various data lengths, aligned or non-aligned, the control bus 13 contains an 8-bit byte mask field which includes a bit for each of the eight possible byte positions, and a controller 155 in the bus interface generates an 8-bit byte mask for applying to the system control bus based upon an internal 4-bit byte mask generated in the memory management unit and connected to the bus interface by lines 156. The memory management unit uses the data length DL control bits on lines 36, originating in the decode of opcode and operand specifiers in I-Box 20 via bus 38, and of course the low-order bits 0-2 of the address on bus 31 defines the starting byte address. In this manner, transition is made between the 32-bit internal data bus 41 and 64-bit system data bus, and between the 30-bit internal address bus and the 27-bit system address bus.

The system control bus 13 also contains a 4-bit bus command, which is driven by or received by the controller 155 of the bus interface unit 42. This bus command defines what operation is occurring on the system busses, i.e., the CPU 10 reading instruction stream quadwords from memory 15, the CPU 10 reading data stream quadwords, the CPU 10 writing to memory 15, etc. This 4-bit command is asserted along with an address strobe which is another of the lines of the control bus 13, which also includes lines for Ready, Read, DMA Request, Interrupt, Halt, as well as coprocessor controls, as may be needed for implementing a complete system.

Data and addresses, and bus commands, are transferred in and out by an in-latch 158 and a dual out-latch 159, each of which contains a 64-bit data register 160, a 27-bit address register 161, and a bus command register 162. In this manner, the in-latch 158 can receive a 64-bit quadword from bus 11 in one cycle and transfer two 32-bit longwords to the internal bus 41 in two cycles. Likewise, each out-latch 159 can load two 32-bit longwords in two cycles then a 64-bit quadword can be transfered to the system bus 11 in one cycle. The reason for having two identical out-latches is to speed up CPU 10 writes to memory, since the memory write operation on the external busses 11, 12, 13 takes three cycles; with two out-latches the second can be loading while the first is being written to the memory 15 via the system data bus 11.

A memory read transaction is implemented by the bus interface unit 42 when the internal command bus 125 indicates a memory read, as signalled from the memory management unit 30, occuring when the memory management unit is requesting data specified by the physical address driven onto the internal address bus 31. If this address is found in the primary cache 40 tag store, the cache 40 drives the internal data bus 41 with the data and the intended receiver (I-Box 20 or E-Box 21) latches the data from the data bus 41. If the tag misses in the tag compare 143 of the primary cache, the tag hit signal on line 147 is de-asserted, and the read command on lines 125 and the physical address on bus 31 are loaded into the out-latch 159, and the controller 155 takes over and services this read request whenever the system busses are available in the next few cycles; no further commands from the M-Box 30 will be serviced until the requested data has been received and latched into in-latch 158. The unit 42 drives the data from the in-latch onto the bus 41 and thus to the intended destination, the I-Box, the E-Box or P-Cache. As an example, if the primary cache misses, and the data must be fetched from main memory 15, the read transaction may take six machine cycles, during which the pipeline of the CPU is stalled.

A memory write sequence begins with a write command being asserted on the internal command bus 125 by the M-Box, at which time the M-Box also drives the internal byte mask onto lines 156. Because the cache 40 is of the "write-through" type, all memory writes are "tried" in the cache and executed in main memory. Thus when a write command is on the internal command bus 125, the P-Cache 40 compares the address on the bus 31 to its tag array. If the reference hits, the data then on the ID bus 41 is written into the cache RAM 130. If the tag compare misses, the data is ignored by the P-Cache. In either case, the data on the IA bus 31, the ID bus 41, the internal command bus 125 and the byte mask, are all loaded into the out-latch so that an external write sequence can write to main memory (and a back-up cache if used).

Pipelining

Figure 9:
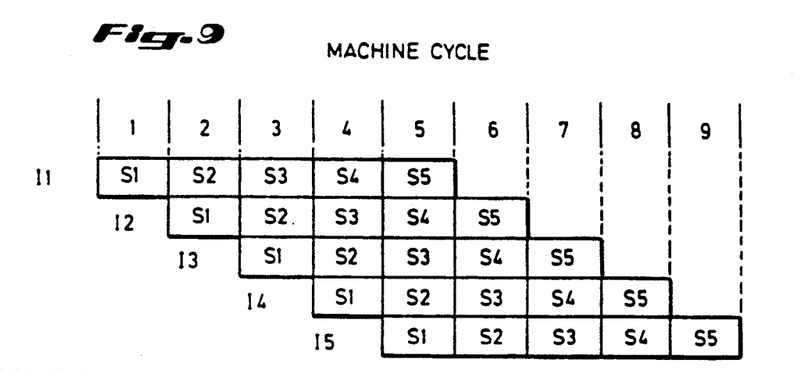
FIG. 9 is a timing diagram showing events occurring in the pipelined CPU 10 of FIG. 1 in successive machine cycles.

The CPU 10 of FIGS. 1–8 is highly pipelined; events in the execution of an instruction are spread over many machine cycles, and execution of parts of a number of instructions are overlapped, i.e., occurring at the same time. The CPU uses a five-segment pipeline, as illustrated in a general sense in FIG. 9, where an instruction I1 is seen to begin its execution in segment s1 during cycle 1, and continue through segment s5 in cycle 5. Instruction I2 begins execution in segment s1 in cycle 2, when instruction I1 is in segment s2, and likewise continues through to segment s5 in cycle 6. In cycle 5 and thereafter, there are parts of five different instructions executing in parallel in the five segments of the pipeline. Of course, FIG. 9 is an idealistic situation, where it is assumed that every instruction executes in exactly five segments, and there are no stalls or exceptions; in this ideal case the average execution rate would be one instruction per machine cycle.

Figure 10:
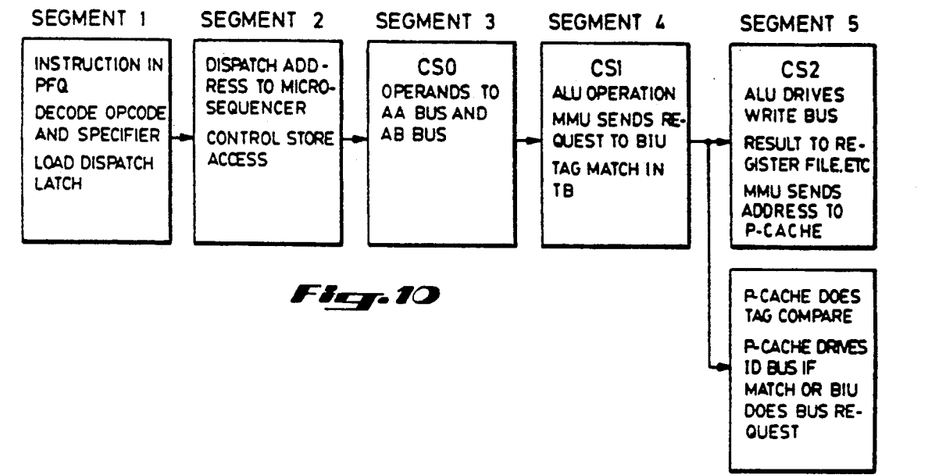
FIG. 10 is a diagram of events vs. time showing the details of an instruction execution in the CPU of FIGS. 1-8.
Figure 11:
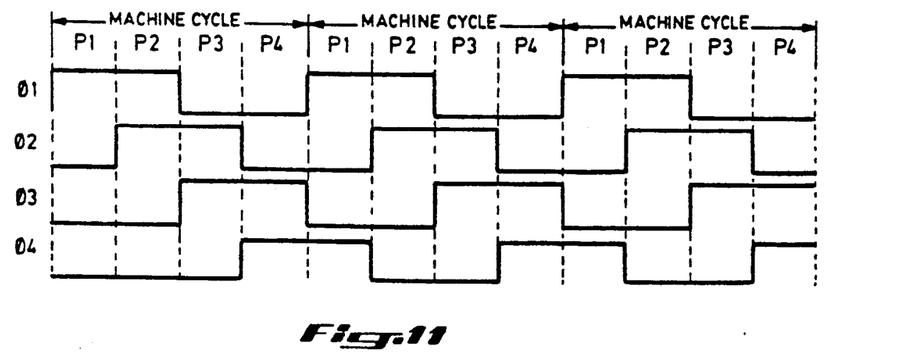
FIG. 11 is a timing diagram of the four phase output clocks produced by the clock generator in the CPU of FIG. 1.

The actual events occurring in the five segments of the pipelining in the CPU 10 of FIGS. 1–8 are more fully shown in FIG. 10. First, it will be noted with reference to FIG. 11 that the CPU 10 is clocked by the clock generator 44 to provide four phases P1, P2, P3, and P4, of equal length, in each machine cycle. These clock phases are used to drive the CMOS circuitry used to construct the CPU 10, in the example embodiment.

In segment-1 of FIG. 10, if the instruction unit 20 has a valid instruction and operand specifier present in the prefetch queue 90 during phase P1, then this information is decoded in the decoders 94 and 95 during P2 and P3, so that the output of the dispatch multiplexer 100 is available in P4 and the latch 101 is loaded with the dispatch address. Latch 102 is loaded in P4 with parsed specifier extensions, which are part of the instruction stream data.

In segment-2, the dispatch address is driven onto bus 25 during P1, and the control store 22 is accessed during P2 and P3. The microinstruction is available at the output 26 during P4 of this segment, ready for loading to the first level of controlled elements of the execution unit in P1 of the next cycle. Also in this segment-2, the specifier extensions, if any, are formatted in going from latch 102 through the formatter 103 to latch 104, and the data such as Sn and Rn is calculated and latched, and the AT/DL information is latched, so this data and control information will be available for the execution unit 21 via bus 38 at the beginning of the next cycle.

In segment-3 of the pipeline, also referred to as the CS0 segment, the execution unit 21 accesses the various registers or busses and places the data to be operated upon on the AABus 33 and ABBus 46, based upon the A and B control fields of the microinstruction available in a 34-bit CS0 latch 165, where it has been loaded via bus 28. The register file 50, the internal data bus 41, the immediate data bus 43, are all sources for the operands to be loaded to AABus and ABBus in this segment, as well as the remainder of the register set, including the program counter 56, the address registers 113, 114 and 115 in the memory management unit 30, etc.; all of these are set up to be available for read in P4 of this cycle. Also, the execution unit accepts the control bits on bus 38 during P1 of this segment.

In segment-4, also called the CS1 segment, the operation specified by the ALU Function part of the microinstruction, if it is a Basic or a Constant type as seen in FIG. 4, is performed in the ALU 45, or, if the microinstruction is a Shift, the operation specified by the Shift Function and Shift Value fields of the microinstruction is performed in the shifter 48. Since the control store 22 will be producing a new microinstruction during every cycle, it is necessary to have stored the microinstruction from the last cycle when the same microinstruction was used in segment-3; to this end, the microinstruction output 28 available from the control store is latched in the CS0 latch 165 and the output of this latch is used for the operations performed in segment-3, then is latched at the end of the cycle into another CS1 latch 166 as seen in FIG. 3 so that the microinstruction is available for the execution unit 21 in segment-4. Again, the output of this latch 166 is stored in a similar CS2 latch 167 at the end of segment-4 (fourth clock cycle for this instruction) for use in segment-5.

The operation of the memory management unit 30 occurs in parallel with the pipeline segments of the execution unit 21. The microinstruction from bus 28 is latched in segment-3 into a different CS0 latch 168 seen in FIG. 6, then into another CS1 latch 169 in segment-4, so the microinstruction Memory Request field seen in FIG. 4 will be available when needed. During P2 of the machine cycle of segment-4, the unit 30 sends a request to the bus interface unit 42 if the busses are going to be required. The unit 30 determines the address source defined by the microinstruction which is in the CS1 latch 169, among the possible sources of the ALU out bus 34, the VA register 113, etc, and the virtual address bus 110 has the selected address available during P4, and the translation buffer 111 makes the tag look-up. At the end of segment-4, the microinstruction is transferred from the CS1 latch 169 to the CS2 latch 170 through the multiplexer 171, if no delay is introduced by a fault or exception.

In segment 5, the write bus 35 is driven by the ALU 45 or shifter 48 output in the execution unit 21, and writes to the destination defined by the W field of the microinstruction in CS2 latch 167. The possible destinations include a selected register in the register file 50 or the other ones of the register set, the internal data bus 41 via the rotator 53, the AABus or ABBus for bypass, or the virtual address bus 110 in the memory management unit. During P1 of segment-5, within the memory management unit 30, the PTE is read to bus 119 and onto the internal address bus 31 via bus 32 if the translation buffer 111 has found a match. The row decoder in the primary cache 40 receives the address from IA bus 31 during P2 and accesses the data and the tag by the end of P2, then the tag comparator 143 does the tag compare in P3; if there is a match then data is available on the internal data bus 41 at the end of P3 if a read is being performed or is written to cache memory 130 in P4 if it is a write. If there is no tag match, then a miss is signalled in P3 on line 147. In the memory management unit, if the translation buffer 111 does not detect a tag match, then a exception is determined by P2 of segment-5 and signalled so that a routine to look up the page number for generating a physical address can be implemented.

Population Counter

Figure 12:
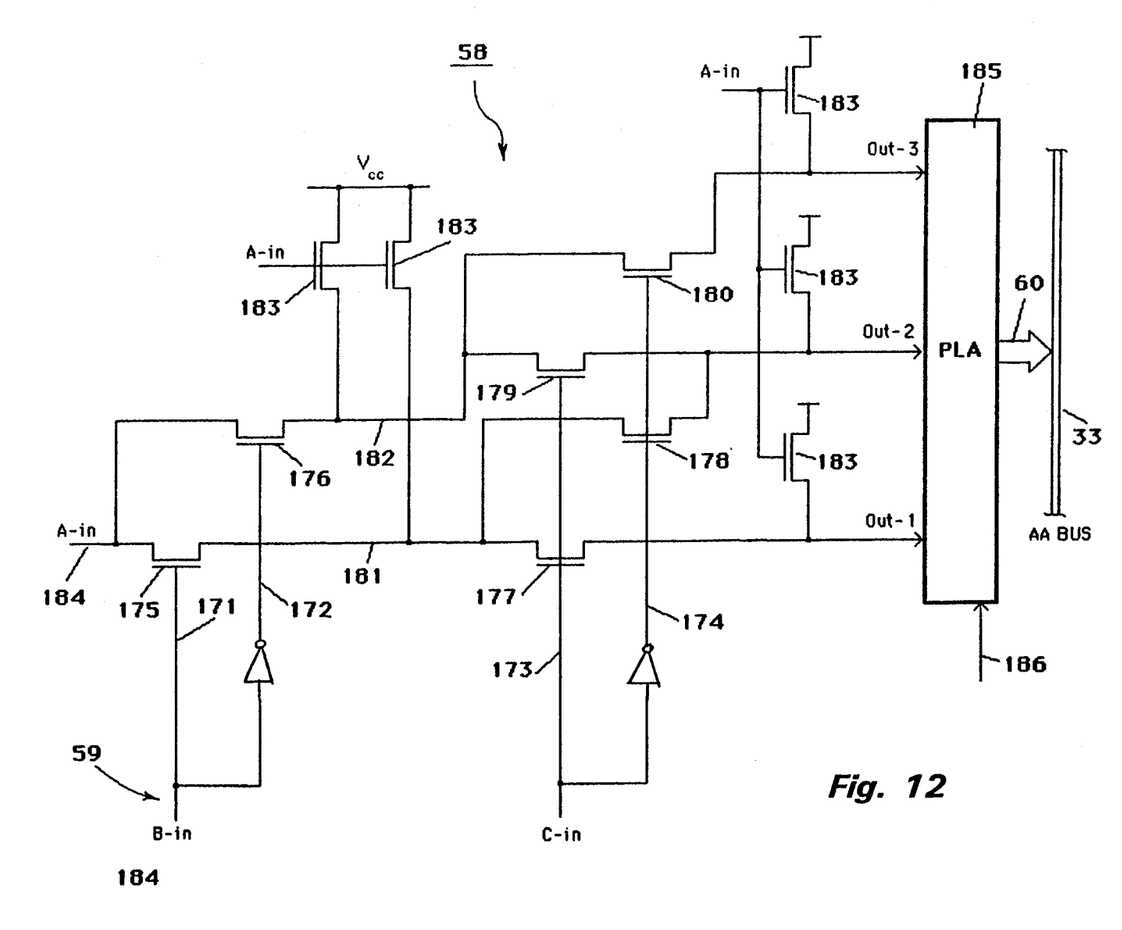
FIG. 12 is an electrical diagram of a population counter circuit according to one embodiment of the invention.

As mentioned above, the population counter 58 of FIG. 2, constructed of the circuitry of FIG. 12, produces a binary value at output 60 equal to the count of bits set in the binary which is word input on lines 59. In this embodiment, the population counter 58 calculates and latches the bit count of the lower twelve bits of the ABBus 46, every non-stalled cycle. Whenever requested by the microinstructions, the population counter 58 drives the result on to the AABus 33. The result that is sent on to the AABus 33 via output 60 is four times the number of set bits on input 59, to allow one 32-bit longword for each register to be saved. This value is the address offset that will be created in a stack pointer if longword registers of number equalling that of the bits set in the input word are pushed onto or popped from a memory stack in memory 15.

The population counter 58 is used by the microroutines that implement the CALL, RETURN, PUSHR (push registers), and POPR (pop registers) CPU instructions. Each of these instructions uses a save-mask to record which registers need to be saved in or retrieved from a stack defined in memory 15. Before the registers specified by the save-mask can be pushed onto or popped from the stack, stack overflow and underflow errors need to be checked for. This is done by a sequence of microinstructions that first put the save-mask on the ABBus 46(in segment-3 of the pipeline represented by FIG. 11), then read the address offset generated in population counter 56, then in another microinstruction subtract or add the address offset from the stack pointer which is always stored in one of the registers of the register file 50, and finally probe the memory 15 to see if the computed address is write-able. The stack has guard pages on either side, set up by the operating system.

It should be noted that the population counter 58 that is used in the execution unit for the process of determining the memory offset of a stack pointer while pushing onto or popping from memory a set of registers specified by a save-mask, reduces considerably the number of machine cycles required to achieve the register save operation. In contrast, a microroutine that loops through checking each bit of the save-mask and accumulating a count of the bits set would take at least twelve cycles for a 12-bit save-mask. The invention described uses just one microinstruction to count the bits of the save mask on the ABBus.

The combinatorial logic that is used to implement the population counter 58 is shown in more detail in FIG. 12. This type of logic is also referred to as a tally counter, and has been used for various purposes. The parallel inputs of this counter are the bits from the ABBus 46. Though the population counter 58 operates on a twelve bit input, the logic circuit in FIG. 12 is illustrated for a two-bit input for simplicity; the circuit can be generalized for any number of input bits. If there are n inputs, the number of outputs is n+1, each output corresponding to a unique number of high inputs. The one extra output is for the case when no inputs are high.

The circuit includes inputs B-in and C-in which are received from the AABus as part of input 59 and inverted to produce true and complement inputs on lines 171 and 172 for the B-in and on lines 173 and 174 for C-in. These input lines are connected to gates of the transistors 175-180. Outputs Out-1, Out-2 and Out-3, and internal nodes 181 and 182 are all set high or prechanged by A-in being high, through transistors 183. When A-in makes a high-to-low transition (during segment-4), one of the outputs will transition low and the other outputs Out-1, Out-2 and Out-3 will remain high, as the transistors 175-180 implement a 1-of-3 selection to discharge one output to the A-in input 184. The one output that transitions low represents the number of bits in the input B-in and C-in that are high.

Table I shows a typical case of inputs and their effect on the output. Assuming input B-in is high and C-in is low (not-C-in on line 174 is high), when A-in is set to low, Out-2 is brought to low state through transistors 178 and 175, which are switched on because lines 171 and 174 are high. The effect of A-in being low on other outputs is blocked by transistors 176 and 177 which are off. Other input combinations can be traced to the outputs in a similar way and Table I results.

TABLE I

| B-in | C-in | Out-1 | Out-2 | Out-3 |
|---|---|---|---|---|
| 0 | 0 | 0 | 1 | 1 |
| 0 | 1 | 1 | 0 | 1 |
| 1 | 0 | 1 | 0 | 1 |
| 1 | 1 | 1 | 1 | 0 |

Thus the number of high bits in the inputs correspond to a unique low output. For an n input tally counter, there are thus n+1 outputs. These n+1 possible results of the tally counter are encoded into a binary number by a ROM or PLA 185, when a control signal 186 from a microinstruction is asserted; this output of the PLA 185 is latched and goes to the AABus 33 via the lines 60 with a 2-bit operand shift and lower order bits zero and one are connected to level zero, resulting in a multiplication by four.

Concluding, therefore, the tally counter - PLA combination permits counting of the number of high bits of the save-mask on the ABBus in just one step in one machine cycle as opposed to a microcode loop which takes many steps. This allows quick calculation of the memory requirement for saving the registers (specified by the bit mask). The memory can then be probed, using this calculated offset and the stack pointer; before the registers are saved in memory. Thus the CALL, RETURN, PUSHR and POPR operations can be performed much more efficiently and quickly.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

What is claimed is:

1. A method of operating a processor, the processor including a CPU having an ALU and a register set, the register set being accessed by said ALU by first and second internal buses, and said processor including a memory, said CPU having repetitive machine cycles and being operated by microinstructions, comprising the steps of:
   a) executing a first series of instructions in said CPU using a number of temporary registers in said register set of the CPU;
   b) upon occurrence of certain events requiring execution of a second series of instructions different from said first series, followed by execution of a return to said first series, determining the magnitude of said number of temporary registers, by operation of a single one of said microinstructions, by
   in every one of said machine cycles when said CPU is not stalled;
      loading onto said first internal bus of said CPU a binary bit mask defining said temporary registers to be saved, and
      converting said binary bit mask of the temporary registers to be saved by a counter logic circuit in said CPU to a value, said value being a multiple of the number of bits in said binary bit mask; then
   in response to a selected single one of said microinstructions, loading said value from said counter onto said second internal bus of said CPU in the same machine cycle as said steps of loading a bit mask and converting said bit mask;
   c) and subsequently storing the contents of said number of temporary registers in memory in a number of locations determined by said value using an address generated in said ALU.

2. A method according to claim 1 wherein said certain events include execution of an instruction in the CPU which requires saving said number of temporary registers to a stack in said memory.

3. A method according to claim 3 wherein said certain event include CALL or RETURN instructions.

4. A method according to claim 1 including the step of testing said memory by said CPU to see if said number of locations is available and storing said contents only if said number of locations is available.

5. A method according to claim 4 wherein said memory used for said step of storing is a stack.

6. A digital processor comprising:
   a) a CPU with execution means for executing a first series of instructions in the CPU using a number of temporary registers of the CPU; wherein said CPU has repetitive machine cycles and is operated by microinstructions stored within said CPU; said execution means including an ALU and first and second internal buses providing inputs of said ALU; and means in said execution means for applying to said first internal bus a binary bit-mask representation indicating said number of temporary registers to be saved;
   b) a counter logic circuit in said CPU coupled to said first and second internal buses in said execution means for determining the magnitude of said
   b) upon occurrence of certain events requiring execution of a second series of instructions different from said first series, followed by execution of a return to said first series, determining the magnitude of said number of temporary registers, by operation of a single one of said microinstructions, by
   in every one of said machine cycles when said CPU is not stalled;
      loading onto said first internal bus of said CPU a binary bit mask defining said temporary registers to be saved, and
      converting said binary bit mask of the temporary registers to be saved by a counter logic circuit in said CPU to a value, said value being a multiple of the number of bits in said binary bit mask; then
   in response to a selected single one of said microinstructions, loading said value from said counter onto said second internal bus of said CPU in the same machine cycle as said steps of loading a bit mask and converting said bit mask;
   c) and subsequently storing the contents of said number of temporary registers in memory in a number of locations determined by said value using an address generated in said ALU.

7. A processor according to claim 6 wherein said means for storing activated upon occurance of an event 8. A processor according to claim 7 wherein said event is execution of an instruction in the CPU which requires saving said number of temporary registers to a stack in said memory.

9. A processor according to claim 8 wherein said instruction is a CALL instruction.

10. A processor according to claim 6 including means for testing said memory to see if said number of locations is available and wherein the memory access means stores said contents in said memory only if said number of locations is available.

11. A processor according to claim 10 wherein said memory used for said storing is a stack.

12. A processor according to claim 6 including means for probing said memory at locations determined by said value to find out if said locations are within prescribed bounds for said storing.

* * * * *